Aug. 20, 1929.　　　　H. A. BAKKE　　　　1,725,695

METER SEAL

Filed June 27, 1928

Inventor:
Hans A. Bakke,
by Charles E. Tullar
His Attorney.

Patented Aug. 20, 1929.

1,725,695

UNITED STATES PATENT OFFICE.

HANS A. BAKKE, OF LYNN, MASSACHUSETTS, ASSIGNOR TO GENERAL ELECTRIC COMPANY, A CORPORATION OF NEW YORK.

METER SEAL.

Application filed June 27, 1928. Serial No. 288,777.

My invention relates to improvements in the sealing arrangement for the casings of electric meters and has for its principal object the provision of an improved means for attaching and sealing the meter cover to the base portion.

The containing casing for the common type of electric integrating meter is usually provided with a cover for the terminal chamber and a cover for the meter chamber. In the past it has been the practice to seal the meter-chamber cover with seal pins and wing nuts and the terminal-chamber cover by means of seal screws. These methods of sealing have certain disadvantages. For example in sealing or unsealing the meter, there are loose parts to handle such as nuts and screws which require time and, being small, are easily dropped and lost. The pressure of the wing-nut on the main cover tends to distort the meter cover and occasionally causes breakage. It is also possible for unscrupulous persons to work a wire under the wing nut through the seal-pin holes in the cover into contact with the rotating part of the meter and thus interfere with its operation.

In accordance with my invention the sealing pins and wing-nuts for sealing the meter-chamber cover are eliminated, and the cover itself is provided with a bail pivotally attached to its rim and adapted to engage pins on the sides of the meter base. By a simple movement of the bail the cover is attached to the base and the bail is brought into locking and sealing position.

Figure 2:
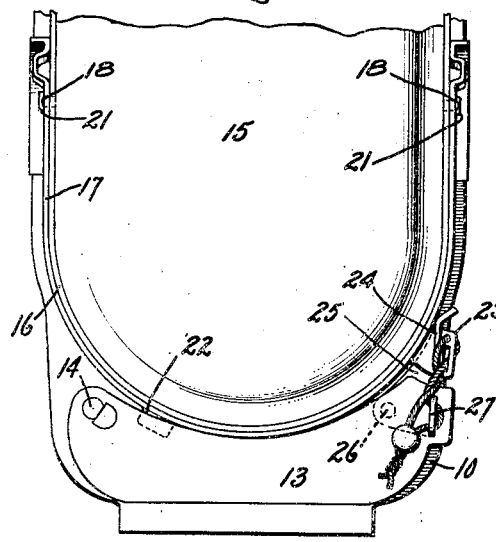
Figure 3:
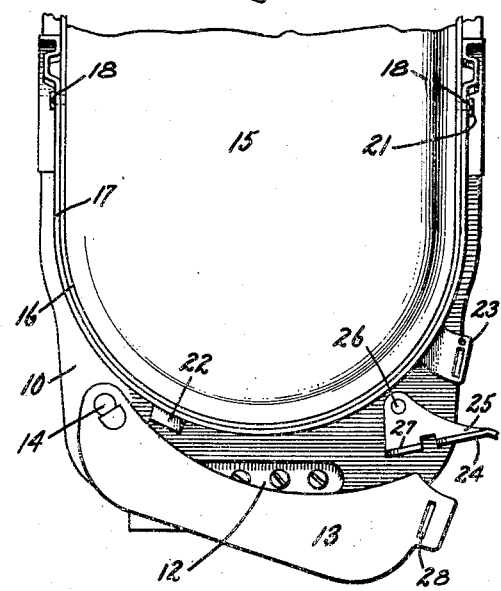
Figure 4:
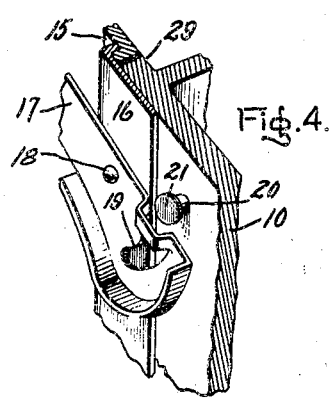

The novel features which I believe to be characteristic of my invention are pointed out in the appended claims. My invention itself, however, will best be understood by reference to the accompanying drawings in which Fig. 1 illustrates a meter casing built and sealed in accordance with my invention and Figs. 2, 3 and 4 illustrate details thereof.

Figure 1:
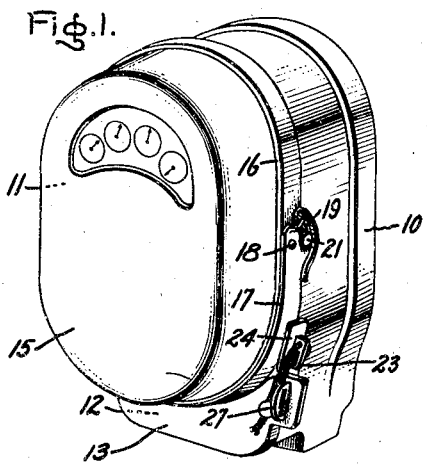

Referring to the drawings in detail, Fig. 1 illustrates a common type of integrating meter having a base 10 supporting the meter mechanism and the terminals within chambers at 11 and 12 respectively. A cover 13 hinged at pin 14 covers the terminal chamber 12, and a cover 15 covers the meter-chamber 11. Cover 15 may be of either glass or metal. If it is of glass it is attached to the base 10 with the aid of a flanged collar 16, the flange of which engages a similar flange on the rim of the glass cover and holds it against a raised flange 29 on base 10. If the cover is made of metal this collar 16 may be integral with the cover.

A bail 17 is pivotally mounted on collar 16 by means of pins 18 located on opposite sides of the collar. Bail 17 is widened opposite pins 18 and is provided with slots 19. Slots 19 are so located and shaped that when bail 17 is in a position substantially perpendicular to the collar 16 the open ends of the slots are in line with, and ready to engage, pins 20 on base 10. Pins 20 are provided with heads 21. By moving the bail downward, slots 19 engage the body of pins 20 and heads 21 prevent the bail from slipping off these pins. Slots 19 are so shaped that as bail 17 is moved downward, in line with collar 16, the collar is pulled towards pins 20 and firmly held against the raised portion 29 of base 10.

Bail 17 is so shaped that when in line with collar 16 and in the cover holding position it fits snugly against the lower half of the collar. It is provided with two lugs 22 and 23. Lug 23 is adapted to be engaged by a lug 24 on a locking member 25 mounted pivotally about pin 26 on base 10. When lug 23 is engaged by lug 24 of the locking member 25, a lug 27 on locking member 25 is in position to be inserted into hole 28 on cover 13. When cover 13 is in position over lug 27, it covers lug 22 and holds bail 16 tightly against the base 10. In this relative position of the members, clearly illustrated in Fig. 2, the meter chamber-cover 15 can be sealed by drawing a wire through the openings in lug 23, and the cover 13 can be sealed by drawing a sealing wire through lug 27. It is however, usually preferable to seal the two covers by drawing one sealing wire through lugs 23 and 27 as illustrated in Figs. 1 and 2.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. A meter casing having a base portion provided with a meter chamber, a cover for said chamber, means for fastening said cover to said base including a bail mounted on said cover and adapted to engage said base, and means for locking said bail to said base.

2. A meter casing having a base portion provided with meter and terminal chambers, separate covers for said chambers, means for fastening said meter-chamber cover to said base including a bail mounted on said cover and adapted to engage said base, and means including said terminal-chamber cover for locking said bail to said base.

3. A meter casing having a base portion provided with meter and terminal chambers, separate covers for said chambers, means for fastening said meter-chamber cover to said base including a bail pivotally mounted on said cover and adapted to engage said base and means including said terminal-chamber cover and a locking member for locking said bail to said base.

4. A meter casing having a base portion provided with meter and terminal chambers, separate covers for said chambers, means for attaching said meter-chamber cover to said base including a collar adapted to engage said cover and fit over said base, a bail pivotally mounted on said collar and provided with slots adapted to engage pins on said base and means including said terminal-chamber cover for locking said bail to said base.

In witness whereof, I have hereunto set my hand this 25th day of June, 1928.

HANS A. BAKKE.